United States Patent [19]
Goates

[11] Patent Number: 5,826,612
[45] Date of Patent: Oct. 27, 1998

[54] ORIFICE SCHEDULING BALL CHECK VALVE

[75] Inventor: Eldon Lamar Goates, Westland, Mich.

[73] Assignee: Ford Global Technologies, Inc., Dearborn, Mich.

[21] Appl. No.: 937,265

[22] Filed: Aug. 31, 1992

[51] Int. Cl.[6] .................................................. F16K 17/18
[52] U.S. Cl. .................... 137/110; 137/493; 137/516.25; 137/568
[58] Field of Search ..................... 137/110, 493, 137/493.7, 493.8, 493.9, 568, 462, 516.25

[56] References Cited

U.S. PATENT DOCUMENTS

| | | | |
|---|---|---|---|
| 2,418,634 | 4/1947 | Hallerstrom | 137/493.9 |
| 3,683,957 | 8/1972 | Sands | 137/462 X |
| 4,439,984 | 4/1984 | Martin | 137/493.9 X |
| 4,612,766 | 9/1986 | Eder | 137/568 X |
| 4,872,475 | 10/1989 | Xiang-Wei | 137/493 |

OTHER PUBLICATIONS

Toyota, Lexus 1990 Repair Manual, vol. 1, p. AT–95.

*Primary Examiner*—Stephen M. Hepperle
*Attorney, Agent, or Firm*—Frank G. McKenzie

[57] ABSTRACT

A check valve for use in an hydraulic control circuit includes separator plates each having an orifice of predetermined size and a ball retained between the separator plates, adapted to close one of the orifices and to open a port and parallel passages communicating with a chamber in which a ball is retained. The ball chamber is in continual communication with the orifice that is not closed by the ball.

3 Claims, 2 Drawing Sheets

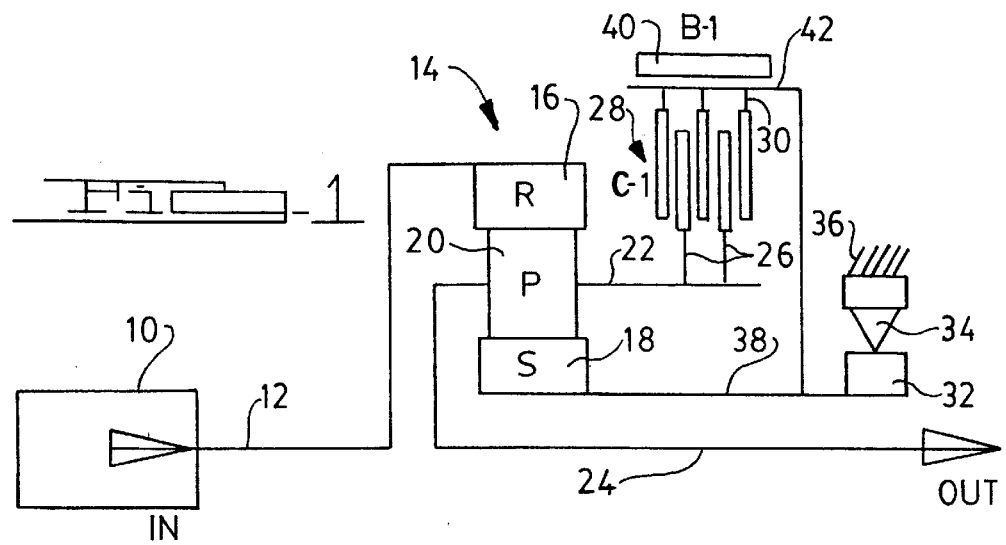
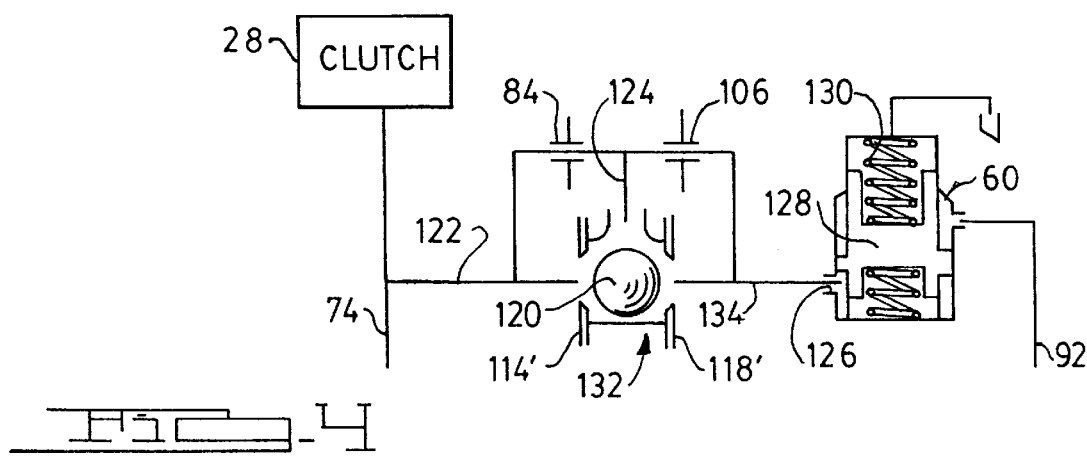
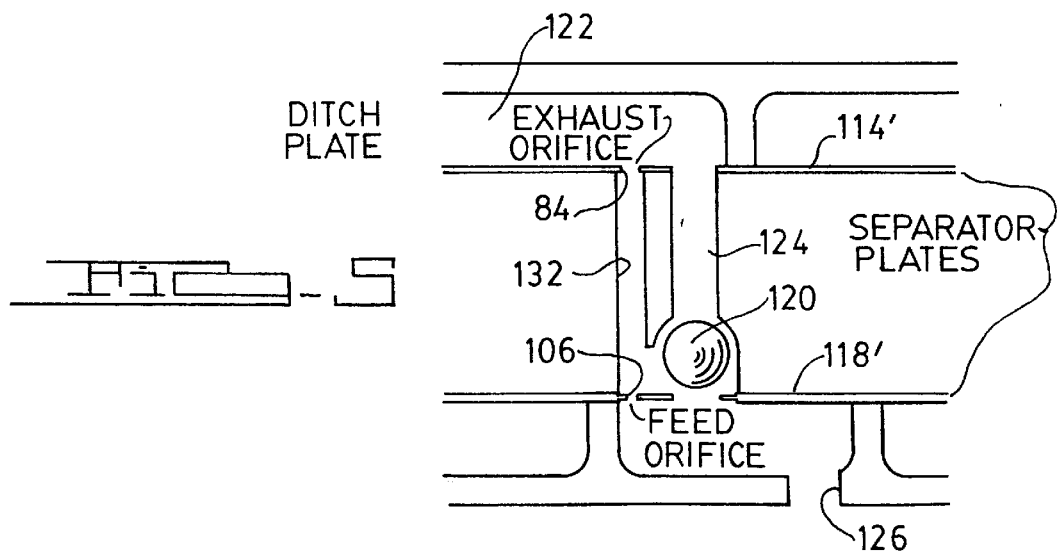

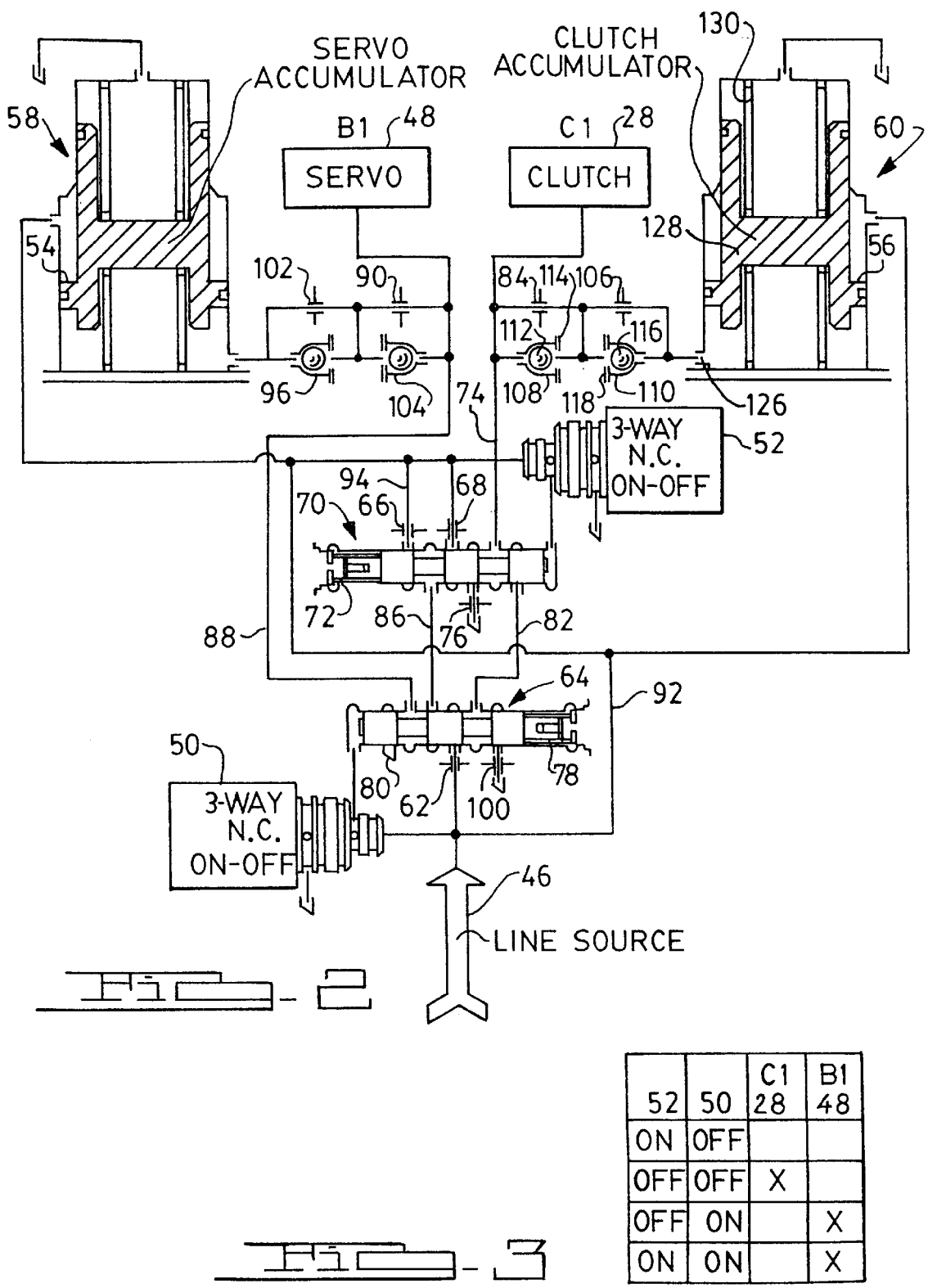

ORIFICE SCHEDULING BALL CHECK VALVE

BACKGROUND OF THE INVENTION

1. Field of the Invention

This invention relates to the field of hydraulic controls for automatic transmissions. In particular, it pertains to ball check valves and to an arrangement of them that selectively closes one passage and opens another passage in accordance with the directional sense of a differential pressure.

2. Description of the Prior Art

Check valves are used in hydraulic circuits to permit flow in one direction and to prevent flow in the opposite direction. A conventional check valve for this purpose includes a ball retained in a chamber having a sealable orifice at one side and an nonsealable aperature at an opposite side, the orifice and aperature being connected to lines of the circuit. Pressure differential across the chamber forces the ball into seated, sealing contact on the orifice, thereby preventing flow in a direction toward the orifice and through the chamber of the valve. When differential pressure changes directional sense, the ball is forced away from the orifice and toward an aperture at the opposite side of the chamber but without sealing the aperture, thereby permitting hydraulic flow through the orifice, chamber and aperture.

Check valves of this type are used in hydraulic systems to permit flow through the orifice of the check valve when the flow direction is toward the aperture and to prevent flow through the check valve and the lines connecting it to the hydraulic circuit when differential pressure across the chamber would produce flow from the chamber to the orifice.

In the hydraulic control system of an automatic transmission, conventional ball check valves are used to control the rate of fluid flow, as determined by the size of the orifice of the check valve, in certain portions of the circuit. Control of the flow rate results when pressure differential across the check valve directs flow from the aperture to the orifice. The valve entirely checks flow in the opposite direction.

In the prior art, check valves of this type are used in a more elaborate arrangement so that they control the rate of flow in both directions by directing flow either through the orifice of the check valve or through another orifice of different size so that the flow rate through the circuit is controlled differently depending on whether the check valve is opened or closed. To produce this effect, two ball-type check valves, each having a orifice adapted to be closed by a ball floating in a chamber and, at the opposite side from the orifice, an aperture that cannot be sealed by the ball.

In one arrangement for correcting check valves to produce this result, the check valves are located in series in an hydraulic line with their orifices mutually adjacent, and a second hydraulic line containing two additional orifices of different size is arranged in parallel with the first line. A third, additional hydraulic line connects a position in the first hydraulic line between the adjacent orifices of the two check valves and a position in the second hydraulic line between the two additional orifices. When the differential pressure across this parallel arrangement is such that it tends to produce hydraulic flow in a first direction, pressure across the arrangement causes one of the check valves to close its portion of the first hydraulic line and the other check valve to open its portion of the first hydraulic line. Then flow is directed through one of the orifices in the second hydraulic line, the third hydraulic line and the open check valve.

Similarly when the pressure differential would produce flow in the opposite direction, the check valve closest to the high pressure closes and causes flow to pass through the other orifice in the second line closest to the high pressure, through the third hydraulic line, and through the orifice of the check valve in the first hydraulic line, which is opened by the pressure differential.

In this way, the orifice of the open check valve and one of the orifices in the second hydraulic line determine the flow rate in one direction, and the orifice of the other check valve and the second orifice in the second hydraulic line determine the flow rate in the opposite flow direction.

SUMMARY OF THE INVENTION

It is an object of this invention to provide a check valve and orifice arrangement in which a single check valve and a single floating ball for closing one or the other of two orifices in the valve operates, in combination with a second line parallel with the check valve and containing two orifices of predetermined size, to establish a first flow rate determined by the combination of orifices that carry flow in a first direction and a second flow rate determined by a second combination of orifices when the flow direction is reversed.

The advantage of this combination is that fewer parts are required because a single check valve having a single floating ball checking device is employed. Also, the space required to be dedicated to this combination of elements in a valve body of an automatic transmission is reduced in comparison to the arrangement of this type known from the prior art.

In realizing this and other objectives and advantages, the check valve and orifice arrangement according to this invention includes separator plates, each having an orifice of predetermined size, a feed orifice and an exhaust orifice; a ball retained in the chamber between the separator plates, adapted to close one of the orifices; a first hydraulic passage connecting the separator plate orifices; a second passage arranged in parallel with the first passage containing two ports connected to the hydraulic circuit and one of the orifices; and a passage communicating with the chamber in which the ball is retained that is continually in communication with an orifice that is not closed by the ball.

A pressure difference in one direction across the arrangement closes a port in the second passage and directs flow through the second passage, ball chamber and feed orifice. A pressure difference in the opposite direction closes the second passage and opens a large port near an end of the second passage the directs fluid through that port, the first passage and exhaust orifice.

BRIEF DESCRIPTION OF THE DRAWINGS

FIG. 1 is a schematic diagram of a planetary gearset clutch and brake band arrangement for an auxiliary transmission.

FIG. 2 is a schematic diagram of an hydraulic circuit used to pressurize and vent the clutch and servo for the brake band of the auxiliary transmission of FIG. 1.

FIG. 3 is a schedule showing the states of solenoids and the corresponding state of the friction elements.

FIG. 4 is a schematic diagram of an alternative embodiment of the check valves and orifices in the circuit of FIG. 1.

FIG. 5 is a cross section through the valve body showing the check valve and orifice arrangement of FIG. 3.

DESCRIPTION OF THE PREFERRED EMBODIMENT

Referring first to FIG. 1, an automatic transmission 10 for producing multiple forward speed ratios is driveably connected through shaft 12 to a planetary gearset 14, which includes ring gear 16, sun gear 18 and a set of planet pinions 20 meshing with the ring gear and sun gear. The planet pinions are rotatably 20 supported on a planet pinion carrier 22, which is driveably connected to output shaft 24 and to friction discs 26 of an hydraulically actuated friction clutch 28. The spacer plates 30 of the clutch are driveably connected to sun gear 18 and to the inner race 32 of a one-way brake 34, whose outer race is fixed on the transmission casing 36 against rotation. Brake 34 produces a one-way drive connection between the shaft 38, which driveably connects the spacer plates 30 and sun gear 18 to the transmission case 36.

Brake band 40, applied by pressurizing the hydraulically actuated servo 48, connects brake drum 42 to the transmission housing against rotation and releases the brake drum when the servo is vented. Brake drum 42 is driveably connected to spacer plates 30, sun gear 18 and the inner race 32 of coupling 34.

In operation, the device of FIG. 1 is used to produce a direct drive connection for a forward gear ratio and a speed reduction during a reverse drive condition. During the forward drive condition, clutch 28 is engaged and brake band 40 is released. This action driveably connects carrier 22 and sun gear 18 and allows one-way coupling 34 to overrun. Therefore, carrier 22 and output shaft 24 are driven at the speed of the input shaft 12. During a coast condition in the forward drive ratio, pinions 20 drive the ring gear 16, and clutch 28 driveably connects sun gear 18 to the pinions.

The main gear box 10 reverses the direction of shaft 12 when reverse gear is selected and the gear/clutch mechanism of FIG. 1 driveably connects shaft 12 to shaft 24 with a speed reduction. To produce this result, clutch 28 is disengaged and band 40 is applied. This action holds sun gear 18 against rotation on the transmission housing, coupling 34 has no differential speed or torque between its inner race 32 and the transmission housing, sun gear 18 provides the gearset reaction, and carrier 22 is driven by ring gear 16. During a coast condition in the reverse drive range, ring gear 16 is driven by the planet pinions, which rotate on the sun gear 18 as the pinion carrier 22 rotates.

Referring now to hydraulic control system of FIG. 2, a source of line pressure 46 supplies pressurized hydraulic fluid at line pressure to a circuit that controls operation of clutch 28 and the servo 48 that actuates brake 40. Line pressure is directed to solenoids 50, 52, piston bias areas 54, 56 of a servo accumulator 58 and clutch accumulator 60, respectively, orifice 62 of a servo shuttle valve 64, and orifices 66, 68 of a clutch shuttle valve 70.

Solenoid 52 controls clutch shuttle valve 70, solenoid 60 controls the servo shuttle valve 64. The two solenoids provide four states which allow the clutch 28 and brake band 40 to be applied according to the state table shown in FIG. 3. The solenoid operated valves are three-way N.C. on-off solenoids.

As shown in the table of FIG. 3, one state is provided in which neither the clutch nor the band is applied. When solenoid 52 is on, the clutch shuttle valve 70 is stroked leftward against compression spring 72, and clutch pressure carried in line 74 is vented through orifice 76. When solenoid 50 is off, the servo shuttle valve 64 is stroked leftward by compression spring 78, thereby exhausting servo pressure in line 88 through exhaust port 80 at the servo shuttle valve.

A default state is provided in which only clutch 28 is applied. This state occurs when both solenoids are off. In this case, servo shuttle valve 64 is stroked to the left by spring 78 and clutch shuttle valve is stroked to the right by spring 72. Then line pressure is connected through orifice 62 to the servo shuttle valve 64 and through passage 82 to the clutch shuttle valve 70. The ports of the clutch shuttle valve allow line pressure to be connected to the clutch through passage 74. Orifice 62, orifice 84 and the clutch accumulator 60 control application of the clutch. Because solenoid 50 is off, servo pressure is exhausted through passage 88 and the exhaust port 80.

As shown in the state table of FIG. 3, two states are provided in which brake band 40 is applied and clutch 28 is exhausted. When solenoid 50 is on, the servo shuttle valve 64 is stroked rightward against spring 78. This action opens a connection between line pressure source 46 through clutch shuttle valve 70 and passage 86 to servo passage 88 and servo 48. The state of solenoid 52 then controls the clutch shuttle valve and determines whether the band is applied through orifice 66 or orifice 68. When solenoid 52 is off, valve spool 90 moves rightward due to the effect of spring 72 and the servo accumulator 58 is filled through orifice 68, passages 86 and 88, and orifice 90. When solenoid 52 is on, the clutch shuttle valve moves leftward and the servo accumulator 58 is pressurized-from line pressure source 46, passages 92, 94, orifice 66, passages 86, 88, orifice 90 and check valve 96. During the two states while solenoid 50 is on and solenoid 52 is either on or off, clutch 28 is vented. The clutch is vented through passage 74, the clutch shuttle valve 70 and orifice 76 when solenoid 52 is on. Clutch 28 is vented through passages 74, 82 and orifice 100 when solenoid 52 is off.

When solenoid 50 is on, the line pressure source 46 is blocked at the servo shuttle valve 64 and passage 82 is vented through orifice 100. When solenoid 50 is on, the state of solenoid 52, through its controls of the state of clutch shuttle valve 70, determines whether clutch pressure is vented through orifice 76 or orifice 100. The state of solenoid 52, therefore, controls selection of the orifice through which servo 48 is pressurized and the orifice through which clutch 28 is vented.

The two orifices 90 and 102 and two check valves 96, 104 that connect passage 88 to the servo accumulator 58 operate to provide additional calibration flexibility during application and exhaust of servo 48. The two orifices 84 and 106 and two check valves 108, 110 that connect passage 74 to clutch 28 operate to provide additional calibration flexibility during application and exhaust of clutch 28. When clutch is applied, clutch 28 pressure forces the ball 112 of check valve 108 to seal the hole in separator plate 114, thereby directing hydraulic fluid through orifice 84 and check valve 110 to accumulator 60 and bypassing orifice 106. When the clutch is vented, clutch accumulator pressure at port 126 forces ball 116 to seal the hole in separator plate 118, thereby directing hydraulic fluid from the accumulator through orifice 106 and check valve 108 and bypassing orifice 84.

When servo 48 is applied, servo pressure in passage 86 forces the ball of check valve 104 to seal the hole in the adjacent separator plate, thereby directing hydraulic fluid through orifice 90 and check valve 96 and bypassing orifice 102. When the servo is exhausted, servo pressure forces the ball of check valve 96 to seal the hole in the separate plate, thereby directing hydraulic fluid from the accumulator 58 through orifice 102 and check valve 104 and bypassing orifice 90.

This arrangement of ball check valves and orifices of FIG. 2 causes hydraulic fluid to flow through one orifice while hydraulic fluid flows in a first direction and through a different orifice if the flow direction is in another direction.

In the arrangement of FIG. 4 the same effect is accomplished with a ball check valve 132 having only one ball 120. In the arrangement shown schematically in FIG. 4, when hydraulic pressure is supplied to clutch 28 through passage 74, ball 120 seals separator plate 118' and directs hydraulic fluid through passages 122, 124, orifice 106, and passage 134 to the accumulator port 126. This forces piston 128 of accumulator 60 upward against spring 130 and the effect of line pressure supplied through passage 92. When the direction of fluid flow is from the accumulator port 126, ball 120 seals separator plate 114' and directs hydraulic fluid through passages 134, 124, orifice 84 and passage 122.

Refer now to the cross section shown in FIG. 5. A ditch plate or transfer plate 136 is a plate like a valve body for directing fluid along passages formed on one side of the plate only but having no valves. A ditch plate is generally bolted to the valve body. When the direction of fluid flow is toward the accumulator port 126, ball 120 is forced downward to a sealing, seating position on separator plate 118'. Therefore, flow is forced through passage 124 and feed orifice 106 to the accumulator feed port 126. When flow direction is reversed, ball 120 is forced upward, sealing passage 124 and directing flow through passage 140 and exhaust orifice 84.

I claim:

1. A device for controlling flow in a circuit supplying fluid to an hydraulically actuated component, comprising:

a source of fluid pressure connected to the component;

accumulator means communicating with the pressure source for storing and discharging fluid;

a first line connecting the pressure source and component to the accumulator, having first and second orifices arranged in series;

a second line arranged in parallel with the first line between the pressure source and accumulator;

check valve means located in the second line for closing flow in the second line past the check valve means and directing flow to a position in the first line between the first and second orifices.

2. A check valve for detecting flow of hydraulic fluid, comprising:

a first plate having a first orifice and first port;

a second plate having a second orifice and second port;

a first passage connecting the first and second orifices;

a second passage in parallel with the first passage, connecting the first port to the second orifice and second port; and means for selectively opening and closing communication between the first and second ports.

3. The device of claim 2 wherein the opening and closing means comprises a ball confined in a space located between the second passage and second orifice, movable by a pressure differential across the ball to a sealed position in the second passage and in the second orifice.

* * * * *